(12) United States Patent
Dubinko et al.

(10) Patent No.: US 7,996,000 B1
(45) Date of Patent: Aug. 9, 2011

(54) MANAGING PAGE SIZES FOR A MOBILE DEVICE USING ESTIMATION OF CONTENT CUSTOMIZER TECHNIQUES

(75) Inventors: Micah Dubinko, Sunnyvale, CA (US); Chen Li, Sunnyvale, CA (US); Heidi Ann Pollock, San Francisco, CA (US); James Liang, Mountain View, CA (US); Jeff Leung, Mountain View, CA (US); Michael Jeremy Temkin, San Francisco, CA (US); Cynthia Johanson, San Francisco, CA (US); Zhaowei Charlie Jiang, Palo Alto, CA (US); Boaz Aharon Shaham, Sunnyvale, CA (US); Hei Chan, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 846 days.

(21) Appl. No.: 11/537,003

(22) Filed: Sep. 29, 2006

(51) Int. Cl.
*H04L 29/12* (2006.01)
*G06F 15/16* (2006.01)
*G06F 3/14* (2006.01)
*G06F 17/27* (2006.01)

(52) U.S. Cl. ........... 455/414.4; 709/217; 709/247; 715/243; 715/238; 715/800; 715/864

(58) Field of Classification Search ........... 455/418, 455/403, 414.4; 709/217–219, 246–247; 715/200, 238, 242, 251, 252, 254, 277, 746, 715/765, 788, 789, 800, 801, 815, 864, 866
See application file for complete search history.

(56) References Cited

U.S. PATENT DOCUMENTS

| | | | |
|---|---|---|---|
| 4,899,136 A * | 2/1990 | Beard et al. ........... 345/156 |
| 5,461,709 A * | 10/1995 | Brown ........... 715/848 |
| 6,563,517 B1 * | 5/2003 | Bhagwat et al. ........... 715/735 |
| 6,611,358 B1 * | 8/2003 | Narayanaswamy ........... 358/442 |
| 6,625,454 B1 * | 9/2003 | Rappaport et al. ........... 455/446 |
| 6,704,798 B1 * | 3/2004 | Mogul ........... 709/246 |
| 6,754,470 B2 * | 6/2004 | Hendrickson et al. ........... 455/67.11 |
| 6,789,229 B1 * | 9/2004 | Dunietz et al. ........... 715/234 |
| 6,950,881 B1 * | 9/2005 | Ndili ........... 709/246 |
| 7,373,422 B1 * | 5/2008 | Paul et al. ........... 709/238 |
| 7,487,453 B2 * | 2/2009 | Goebel et al. ........... 715/746 |
| 7,512,879 B2 * | 3/2009 | Weil et al. ........... 715/251 |

(Continued)

OTHER PUBLICATIONS

"Volantis: Content Delivery Platform," Volantis Systems, 9 pages, http://www.volantis.com/content-delivery-platform (accessed Aug. 29, 2008).

(Continued)

*Primary Examiner* — Matthew Sams
(74) *Attorney, Agent, or Firm* — Frommer Lawrence & Haug LLP; Jamie L. Wiegand

(57) ABSTRACT

A network device, system, and method are directed towards enabling a determination for page size tailoring of content based, in part, on estimating of effects of processes applicable to preparing the content for use on a specified mobile device. Before performing the processes on the content, an estimation of the effects of the configuring processes may be determined. If the estimated content size is determined to be too large for the specified mobile device's memory footprint, page tailoring techniques may be applied to the content. Such page tailoring techniques may include stretching the content across a plurality of files, discarding a portion of the content, reducing portions of the content, or the like. Various processes may then be applied to the content to configure it for use on the specified mobile device.

24 Claims, 6 Drawing Sheets

U.S. PATENT DOCUMENTS

| | | | | |
|---|---|---|---|---|
| 7,581,176 | B2 * | 8/2009 | Wilson | 715/243 |
| 2001/0044849 | A1 * | 11/2001 | Ndili et al. | 709/230 |
| 2002/0161928 | A1 * | 10/2002 | Ndili | 709/246 |
| 2003/0110234 | A1 * | 6/2003 | Egli et al. | 709/217 |
| 2003/0236917 | A1 * | 12/2003 | Gibbs et al. | 709/248 |
| 2005/0090241 | A1 * | 4/2005 | Backes et al. | 455/418 |
| 2005/0138550 | A1 * | 6/2005 | Dermler et al. | 715/517 |
| 2005/0176449 | A1 * | 8/2005 | Cui et al. | 455/466 |
| 2006/0123329 | A1 * | 6/2006 | Steen et al. | 715/500 |

OTHER PUBLICATIONS

"Captcha," (Mar. 12, 2006). In *Wikipedia, The Free Encyclopedia*, 07:41 UTC. Wilkimedia Foundation, Inc. (accessed Feb. 26, 2007), http://en,wikipedia.org/w/index.php?title=Captcha&oldid=43407448.

"Turing test," (Feb. 20, 2007). In *Wikipedia, The Free Encyclopedia*. 12:23 UTC. Wikimedia Foundation, Inc. (accessed Feb. 26, 2007). http://en.wikipedia.org/w/index.php?title=Turing_test&oldid=109540488.

Sybase Performance and Tuning: Locking, Adaptive Server® Enterprise 12.5.1, Chapter 7 How Indexes Work, Aug. 2003, p. 125-126.

Passani, L., "What's the WURFL?" (accessed Oct. 24, 2007)http://wurfl.sourceforge.net.

Passani, L., "Welcome to the WURFL, the Wireless Universal Resource File," (accessed Oct. 24, 2007) http://wurfl.sourceforge.net.

* cited by examiner

MANAGING PAGE SIZES FOR A MOBILE DEVICE USING ESTIMATION OF CONTENT CUSTOMIZER TECHNIQUES

FIELD

The present invention relates generally to mobile communications and, more particularly, but not exclusively to enabling a determination for page size tailoring of content based on estimating of effects of processes applicable to preparing the content for use by a mobile device.

BACKGROUND

The growth of the Internet has brought a corresponding increase in the number and variety of computing devices being employed to communicate over the Internet. Today's computing devices vary from desktop computers with a large variety of features and capabilities, to mobile devices such as pagers, cellular phones, personal digital assistants (PDAs), and the like, with lesser features and/or capabilities. For example, many of these computing devices include some form of Internet browsing capability. In addition, many of the computing devices are configured to allow users access to audio files, and/or graphical files via wireless and/or wired networks.

However, access to some content may be difficult as a result of various limitations, including those of the computing devices, bandwidth, and/or other factors. For example, different mobile devices may have widely varying memory page size constraints, making reliable delivery and rendering of content extremely difficult across disparate mobile devices. While a number of techniques exist to customize content for a particular mobile device, or other computing device, these techniques may have an unpredictable effect on delivery size of the content. When the content's memory page footprint exceeds that of the capability of the mobile device for which the content is to be delivered, the mobile device may be unable to view the content, sometimes even 'locking up.' Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
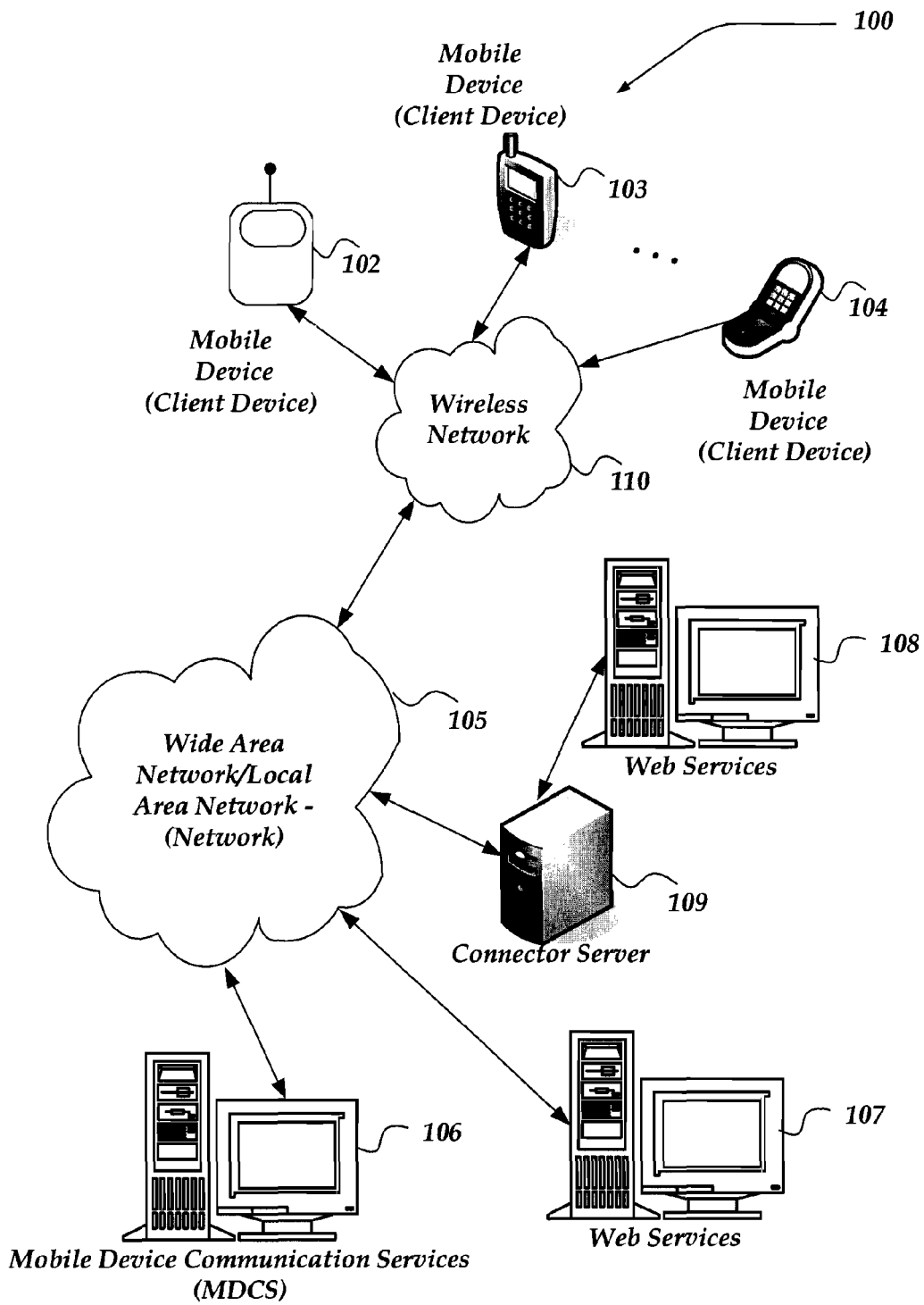
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "content" refers to any form of data that may be communicated over a network between network devices. Content may therefore include, but is not limited to a web page, a graphic, an audio clip, a video clip, a file, a binary file, a document, or the like.

Briefly stated the present invention is directed towards enabling a determination for page size tailoring of content based on estimating of effects of processes applicable to preparing the content for use on a mobile device. In one embodiment, content is received that may be generally configured for use relatively independent of a specified network device. That is, the content may be written or otherwise configured to be relatively generic, and/or independent of variations across mobile devices. Thus, in one embodiment, the content may be configured to employ standard HTTP rules and procedures, or the like. By employing such generically formatted content development procedures, a content developer may focus on the information associated with the content, rather than the nuances of a receiving mobile device.

When a request is received for the content, the content may be converted for use by the specific requesting mobile device. In one embodiment, the content may be converted for use on the specific mobile device by applying a variety of processes to the content. Application of such conversion processes, however, may affect a size of the content. Therefore, before the processes are applied to the content, an estimation of the effects may be determined. If it is determined that the estimated content size may be too large for the specified mobile device's memory page footprint, any of a variety of page tailoring techniques may be applied to the content.

The page tailoring techniques that may be performed may include, for example, determining whether at least a portion of the content has a rubberbandable capability. If the content does include a rubberbandable capability, a portion of content may be 'stretched' across multiple files using, for example, insertion of a "more" and/or "previous" attribute link. In one embodiment, a link, such as a URL, a flag, or other indicator, may be inserted into the content to enable the content to link the multiple resources. The content may also be modified by discarding a portion of the content, simplifying a portion of the content, or the like. Thus, page tailoring may include any of a variety of mechanisms that are directed towards customizing the content to fit within a specified mobile device. In one embodiment, various processes may then be applied to the content, to enable the content to be useable on the specified mobile device.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")–(network) 105, wireless network 110, Mobile Device Communication Services (MDCS) 106, mobile devices (client devices) 102-104, web services 107-108, and connection server 109.

One embodiment of mobile devices 102-104 is described in more detail below in conjunction with FIG. 2. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed. Moreover, mobile devices 102-104 may have limited memory page footprints. Thus, for example, one mobile device may be physically limited to 10 Kbytes of a memory page footprint (size constraint), while another mobile device may be physically limited to some other size of memory page footprint.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), Compact HTML (cHTML), EXtensible HTML (xHTML), or the like, to display and send a message.

Mobile devices 102-104 also may include at least one other client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier. The information may also indicate a content format, and/or a capability of the mobile device. For example, in one embodiment, the client application may be configured to provide information about a type of mobile device, an application available on the mobile device, a memory page footprint for the mobile device, or the like.

Mobile devices 102-104 may also be configured to communicate a message, such as through Short Message Service (SMS), Multimedia Message Service (MMS), instant messaging (IM), internet relay chat (IRC), Mardam-Bey's IRC (mIRC), Jabber, and the like, between itself and another computing device. However, the present invention is not limited to these message protocols, and virtually any other message protocol may be employed.

Mobile devices 102-104 may be further configured to enable a user to participate in communications sessions, such as IM sessions. As such, mobile devices 102-104 may include a client application that is configured to manage various actions on behalf of the client device. For example, the client application may enable a user to interact with the browser application, email application, IM applications, SMS application, and the like.

Mobile devices 102-104 may further be configured to include a client application that enables the end-user to log into an end-user account that may be managed by another computing device. Such end-user account, for example, may be configured to enable the end-user to receive emails, send/receive IM messages, SMS messages, access selected web pages, participate in a social networking activity, or the like. However, participation in various social networking activities may also be performed without logging into the end-user account.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile devices 102-104 and another computing device, network, and the like.

Network 105 is configured to couple MDCS 106, connector 109, and/or web services 107-108 with other computing devices, including, through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (IS-DNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between one computing device and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

MDCS 106 may include any computing device capable of connecting to network 105 to enable conversion of content, for use by a specified mobile device. Thus, MDCS 106 may be configured to receive a request for content from one or more of mobile devices 102-104. MDCS 106 may receive the request in a format that may be specific to the mobile device. For example, the format may be based, in part, on a capability of the mobile device, a type of mobile device, an application on the mobile device, a language employed by the mobile device, including icons, or the like. MDCS 106 may employ a variety of analysis tools to convert the received request into a generic format or format that is relatively independent of a mobile device, carrier, or the like. In one embodiment, MDCS 106 may further provide information about the capability of the mobile device, type of mobile device, or the like, as well as the formatted request, to web services 107-108.

MDCS 106 may receive a response to the formatted request. In one embodiment, the response includes content that may be configured to be relatively device independent. In one embodiment, MDCS 106 may perform various processes that may convert the response content into a format that may be useable on the requesting mobile device. For example, in one embodiment, the response content may be formatted in HTTP, XML, or the like. MDCS 106 may then convert the content for the requesting mobile device, by inserting various headers, footers, or the like into the response. MDCS 106 may further perform various conversions on the HTTP, XML, or other portions of the response content to enable it to be useable by the requesting mobile device. For example, in one embodiment, MDCS 106 may convert at least a portion of the response content into xHTML, cHTML, or the like. In one embodiment, application of the various conversion processes may affect a size of the response content by either increasing or even decreasing its size.

Devices that may operate as MDCS 106 include personal computers desktop computers, multiprocessor systems, microprocessor-based or programmable consumer electronics, network PCs, servers, and the like.

One embodiment of web services 107-108 is described in more detail below in conjunction with FIG. 3. Briefly, however, web services 107-108 may be configured to operate as a website server to provide content in response to a request, an alert action, or the like. However, web services 107-108 are not limited to web servers, and may also operate as a messaging server, a File Transfer Protocol (FTP) server, a database server, a content server, or the like. Additionally, web services 107-108 may be configured to perform multiple functions. Thus, for example, web services 107-108 may be configured as a messaging server, and as a database server. Moreover, while web services 107-108 may operate as other than a website, web services 107-108 may still be enabled to receive a request for web content, documents, or the like.

Web services 107 may, in one embodiment, include, a connector component that is configured to receive content, and to estimate whether the content may exceed a memory page limitation for a mobile device, after the content is later converted for use on the mobile device. Web services 107 may, in one embodiment, employ page tailoring, if it is determined that the content exceeds a threshold associated with the memory page limitation for the mobile device. In one embodiment, web services 107 may employ processes such as described below in conjunction with FIGS. 4-5 to perform at least some of its actions.

Although the connector component is described as operating within, web services 107, the invention is not so limited. For example, in one embodiment, the connector component may reside in another computing device external to the web services. Thus, in one embodiment, connector server 109 may include a connector component, such that web services 108 employs the connector component within connector server 109 to perform the estimation and page tailoring. Thus, web services 107-108 and connector server 109 illustrate various embodiments for implementing and using a connector component.

Devices that may operate as web services 107-108 include personal computers desktop computers, multiprocessor systems, microprocessor-based or programmable consumer electronics, network PCs, servers, and the like.

Illustrative Mobile Client Environment

Figure 2:
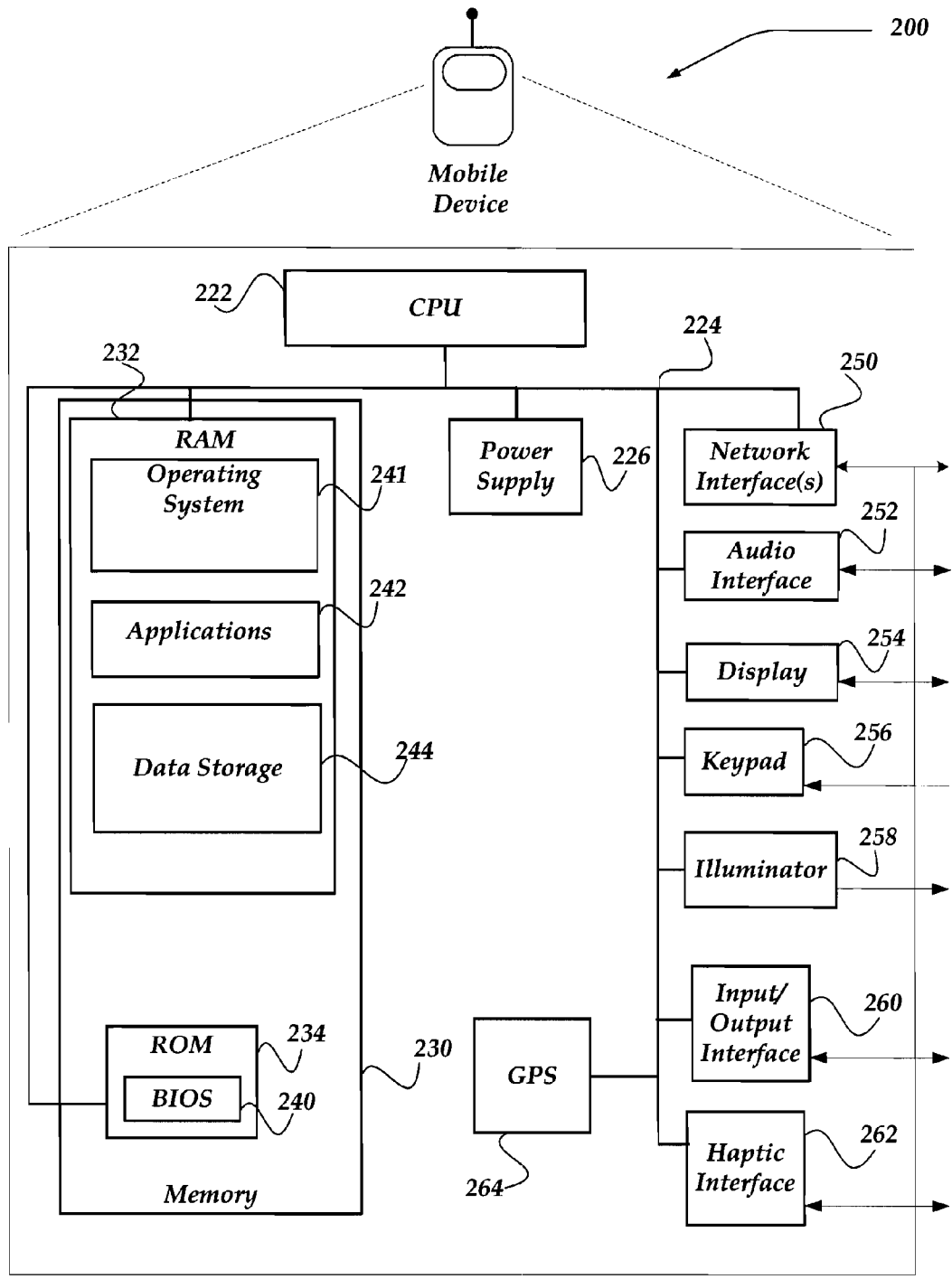
FIG. 2 shows one embodiment of a mobile device that may be included in a system implementing the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, mobile devices 102-104 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 World-wide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by mobile device 200 to store, among other things, applications 242 and/or other data. For example, data storage 244 may also be employed to store information that describes various capabilities of mobile device 200, including, for example, a memory page footprint. The information may then be provided to another device based on any of a variety of events, including being sent as part of a header during a communication, sent upon request, or the like. At least a portion of the information may also be stored on a disk drive or other storage medium (not shown) within mobile device 200.

Applications 242 may include computer executable instructions which, when executed by mobile device 200, transmit, receive, and/or otherwise process messages (e.g., SMS, MMS, IM, email, and/or other messages), audio, video, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, search programs, and so forth.

Illustrative Server Environment

Figure 3:
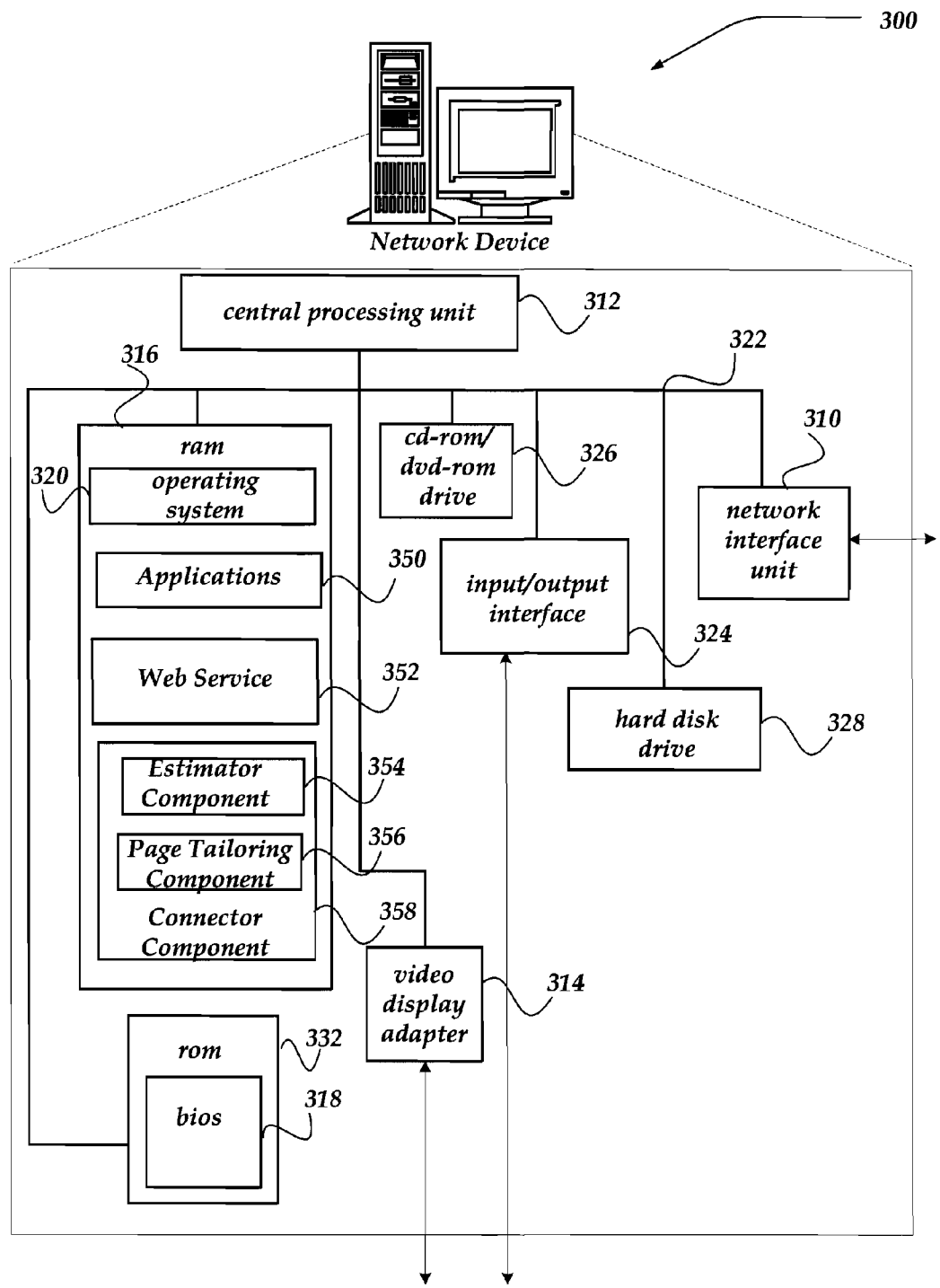
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, web services 107 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, encryption programs, security programs, VPN programs, SMS message servers, IM message servers, email servers, account management and so forth. The mass memory may further include web service 352, and connector component 358. In one embodiment, connector component 358 further includes estimator component 354 and page tailoring component 356.

Web service 352 represents any of a variety of services that are configured to provide content over a network to another computing device. Thus, web service 352 includes for example, a web server, messaging server, a File Transfer Protocol (FTP) server, a database server, a content server, or the like. Web service 352 may provide the content over the network using any of a variety of formats, including, but not limited to WAP, HDML, WML, SMGL, HTML, XML, cHTML, xHTML, or the like. In one embodiment, web service 352 may provide the content formatted to be generally independent of a destination device. Thus, for example, while the content may be formatted for use with a browser that may be capable of displaying content in at least one of the above formats, the content may be formatted independent of a device constraint such as screen size, resolution, memory page footprint, or the like. For example, in one embodiment, the content may be formatted absent a mobile device session identifier, or the like.

Web service 352, may then provide the content to connector component 358. Connector component 358 may further receive information about a mobile device for which the content is to be delivered. In one embodiment, connector component 358 may receive information about the mobile device that may indicate a memory page footprint size, a screen resolution, a type of mobile device, an application on the mobile device, or the like.

Connector component 358 may provide the mobile device information and content to estimator component 354. Estimator component 354 may determine whether the content exceeds a threshold value for the memory page size for the mobile device. If it does, estimator component 354 may provide the content to page tailoring component 356 where page tailoring is performed on the content to modify a size of a file associated with the content, modify the content, or the like.

Moreover, estimator component 354 may further perform an estimation of effects for at least one of a plurality of conversion processes that are arranged to enable the content to be useable on the mobile device. If the estimation of effects indicates that a resulting content exceeds the threshold value for the memory page size, estimator component 354 may then request the page tailoring component 356 perform page tailoring on the content to modify the size of the file associated with the content. In one embodiment, page tailoring may result in partitioning at least some of the content across multiple files. Each of the multiple files may then be further examined by estimator component 354. Connector component 358 may employ processes such as those described below in conjunction with FIGS. 4-5 to perform at least some of its actions.

Although described above with connector component 358 within network device 300, the invention is not so limited. Thus, as illustrated in FIG. 1, connector component 358 may reside within a connector server, such as connector server 109 of FIG. 1, while web service 352 resides within web services 108 of FIG. 1. Moreover, in one embodiment, connector component 358, or at least one of estimator component 354 or page tailoring component 356 may also reside within MDCS 106 of FIG. 1.

Generalized Operation

Figure 4:
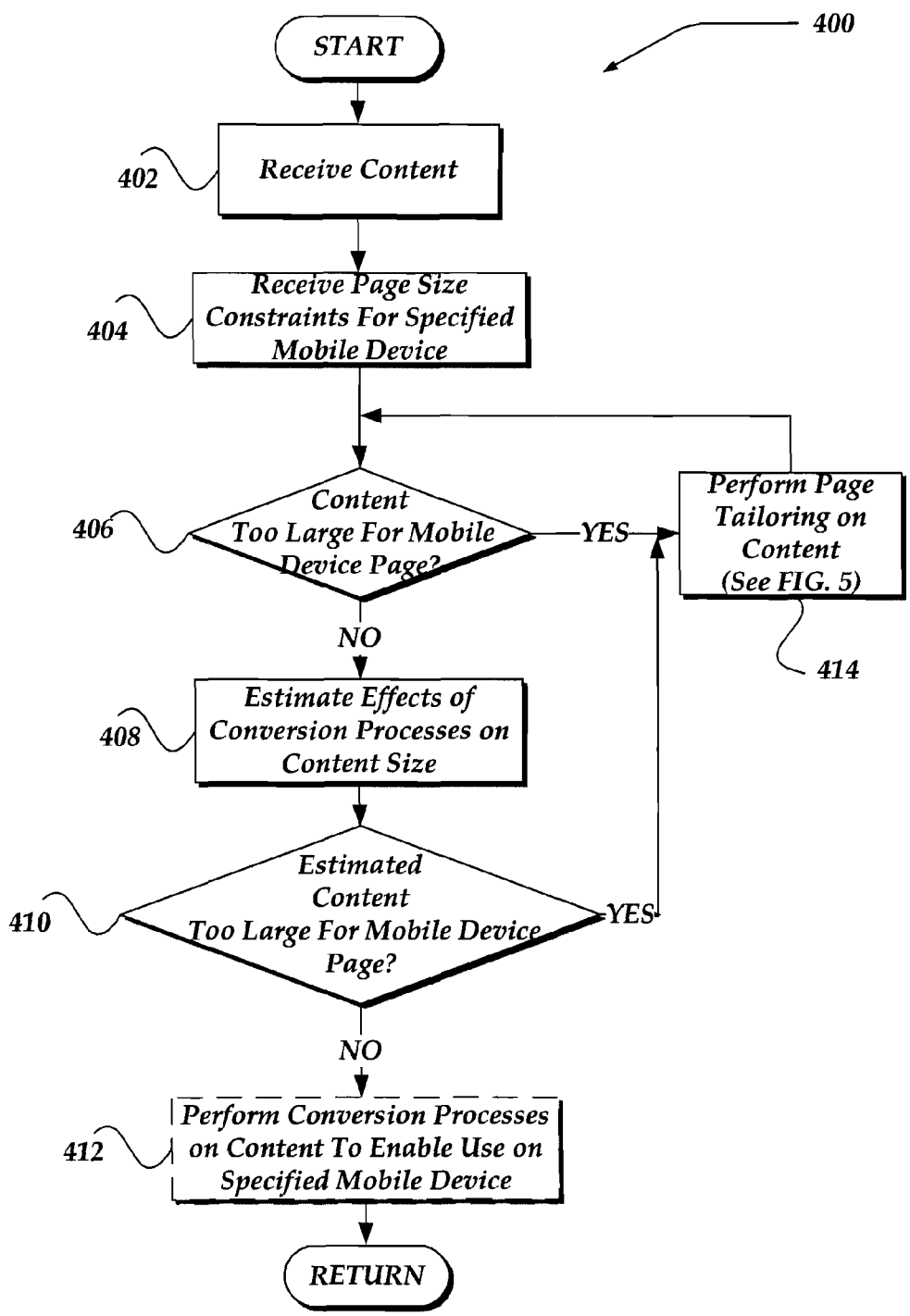
FIG. 4 illustrates a logical flow diagram generally showing one embodiment of an overview of a process for managing content size for a mobile device using process effects estimation.

The operation of certain aspects of the invention will now be described with respect to FIGS. 4-5. FIG. 4 illustrates a logical flow diagram generally showing one embodiment of an overview of a process for managing content size for a mobile device using process effects estimation.

As shown, process 400, begins, after a start block, at block 402, where content is received. The content that is received may be formatted to be relatively independent of the mobile device for which the content is destined. That is, in one embodiment, while the content may be formatted with an assumption that the destination includes a browser, the content might not include mobile device specific information, such as a mobile device session identifier, content formatted for a specific screen size, screen resolution, or even for a memory page size.

Processing moves next to block 404, where information about the destination mobile device is received, including, such information as a memory page footprint (size constraint), or the like.

Process 400 moves next to decision block 406, where a determination is made whether the content is too large for the memory page size constraint. In one embodiment, a threshold value associated with memory page size constraint may be determined. For example, in one embodiment, the threshold may be set to be some percentage of the memory page size constraint. For example, the threshold may be set to some value between 80-95% of the memory page size constraint. However, the threshold may be set to virtually any percentage of the memory page size constraint, and need not be limited to these values. Thus, the determination may be based on whether the content exceeds the threshold value for the memory page size constraint. If the threshold is exceeded, processing may flow to block 414; otherwise, processing may flow to block 408.

At block 408, an estimation of effects is performed for at least one of a plurality of conversion processes that are arranged to enable the content to be useable on the mobile device. In one embodiment, at block 408, a determination may be performed to determine which of the plurality of conversion processes are to be applied to the content. Then, for each of the determined conversion processes, an estimate of a delta page size may be determined. Each of the estimated delta page sizes may then be totaled or otherwise combined to obtain a total delta page size effect.

For example, one of the conversion processes may include a header of about 10 bytes to the content. Another conversion process may look for each URL, or other link within the content, and add to the URL or other link, a session identifier. In one embodiment, the session identifier might add 20 bytes to each URL or link. Still another conversion process may include filtering out certain URLs or other links based on one or more criteria. In this example, then, for the three example conversion processes, some bytes may be added to the content to increase the page size, while other bytes might be removed from the content to decrease the page size. These delta page size effects may be combined to determine an overall estimate for the conversion effects. Moreover, as may be seen in the example, the conversion processes need not be actually performed on the content.

Processing then flows to decision block 410 where a determination is made whether the estimation of effects indicates that resulting content (e.g., the content that might result in performing the conversion processes) exceeds the threshold value for the memory page size. If it does, processing flows to block 414; otherwise, processing flows to optional block 412.

One embodiment of block 414 is described in more detail, below in conjunction with FIG. 5. Briefly, however, at block 414, page tailoring may be performed on the content to modify a size of a file associated with the content. In one embodiment, the page tailoring may result in partitioning the content across multiple content files, where the files are associated to each other through a link, or the like. Where multiple content files are generated, each of the multiple content files may flow through process 400 to further determine an estimation of effects, and/or perform page tailoring upon one or more of the files. Thus, process 400 loops back to decision block 406.

At optional block 412, one or more conversion processes may be performed on the content to enable the content to be useable on the specified mobile device. In one embodiment, block 412 may be implemented within MDCS 106 of FIG. 1. Moreover, the converted content, may, in one embodiment, be delivered to the specified mobile device over a network. Process 400 may then return to a calling process to perform other actions.

Figure 5:
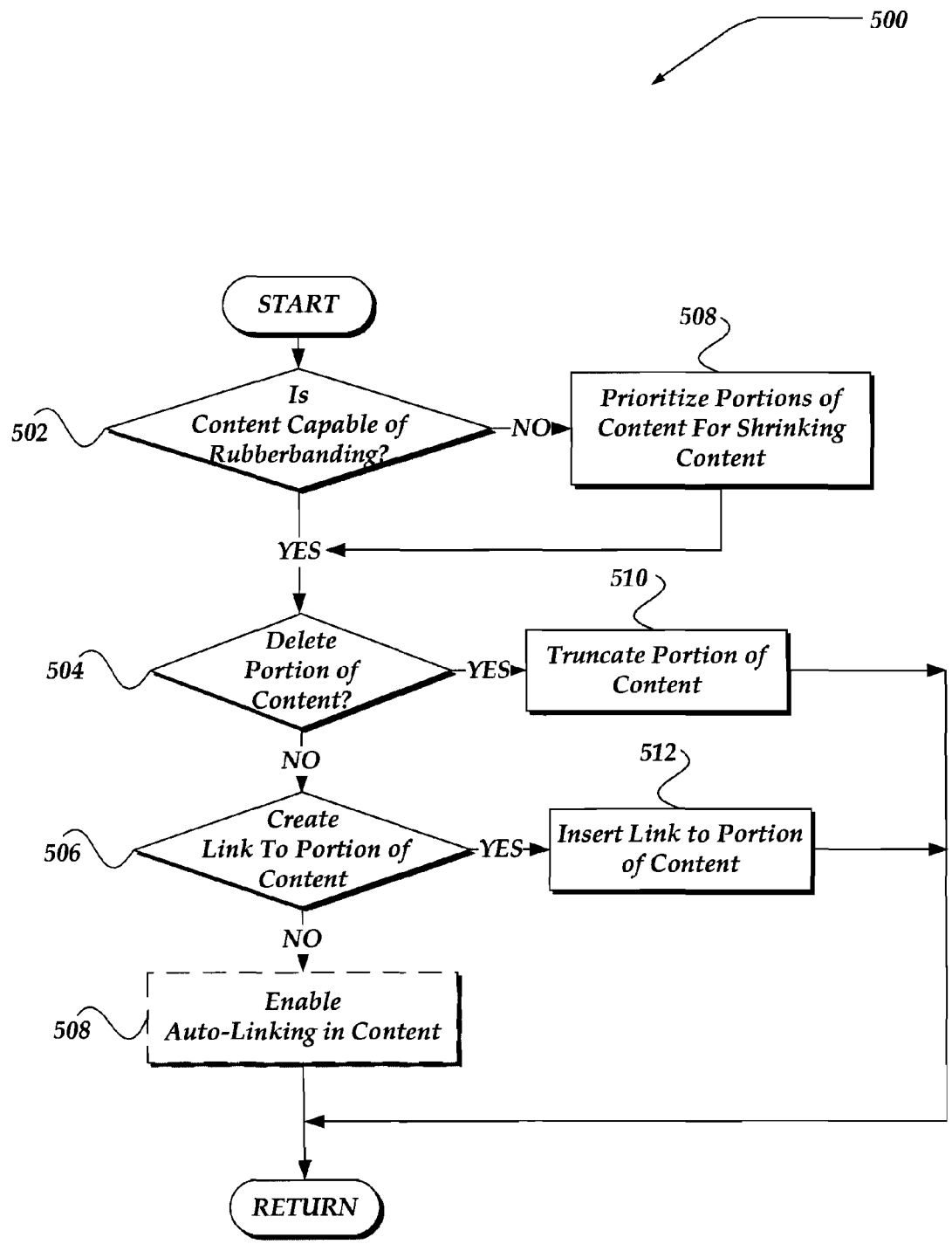
FIG. 5 illustrates a logical flow diagram showing one embodiment of a process for managing page tailoring for content.

FIG. 5 illustrates a logical flow diagram showing one embodiment of a process for managing page tailoring for content. Process 500 of FIG. 5 may be employed as one embodiment of block 414 of FIG. 4. However, other embodiments may also be employed for block 414, without departing from the scope of the invention.

Figure 6A:
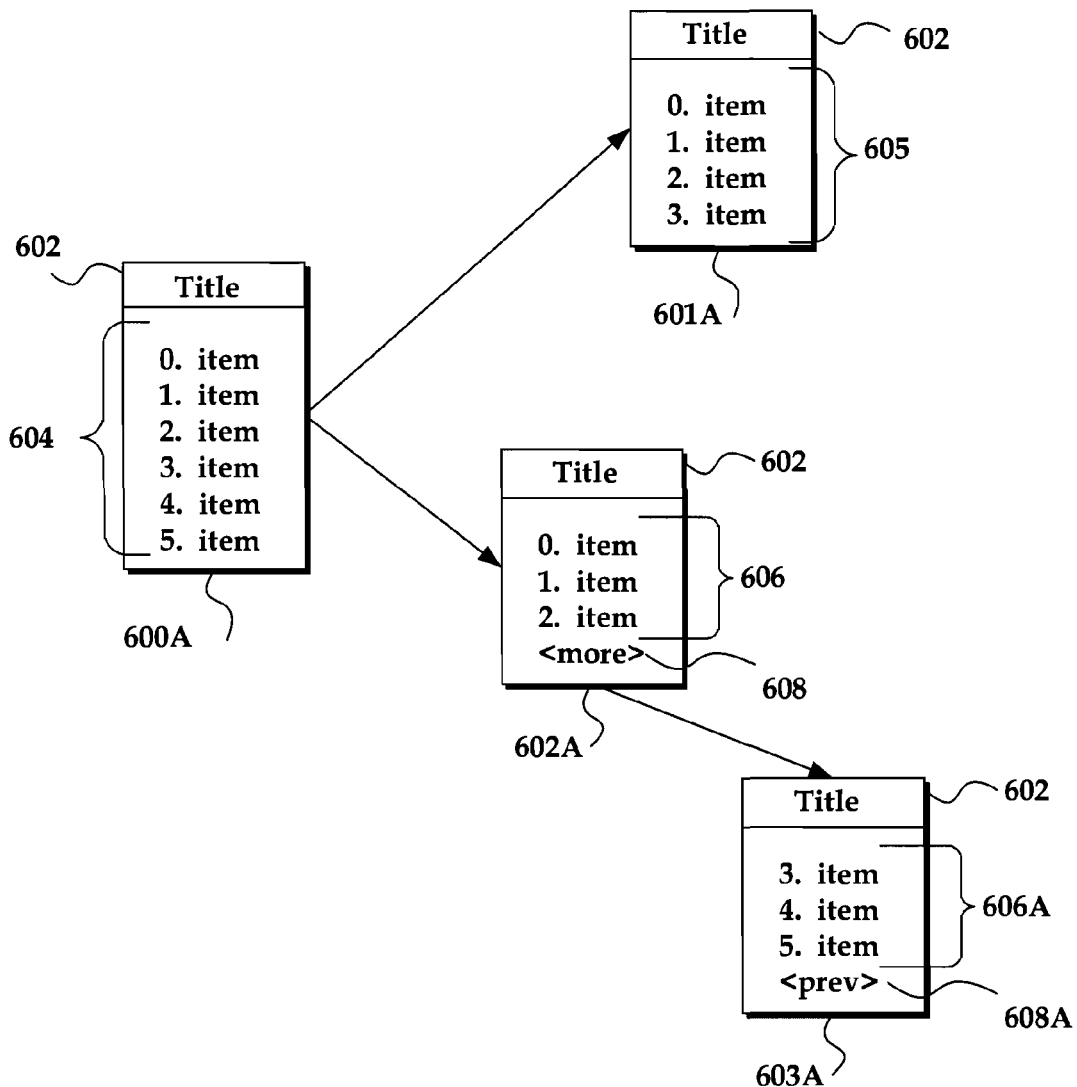
FIGS. 6A-6B illustrate examples of various embodiments of page tailoring content for a mobile device; in accordance with various embodiments.

Process 500 begins, after a start block, at block 502, where a determination is made whether at least a portion of the content is stretchable (e.g., capable of rubberbanding across one or more memory pages for a mobile device). In one embodiment, content may be received that includes a prioritization of portions of the content. Such received content may then be considered to be rubberbandable. In another embodiment, various portions of the content may include types of information that may readily lend itself to being stretchable. One example is shown in FIG. 6A.

If content is not determined to be rubberbandable, then processing proceeds to block 508. If at least a portion of the content is determined to be rubberbandable, processing also flows to decision block 504.

Figure 6B:
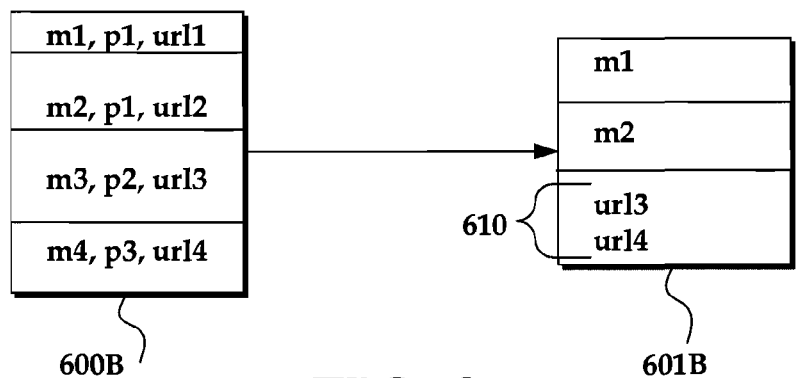

At block 508 at least a portion of the content may be prioritized, such that the content may be capable of rubberbanding. In one embodiment, prioritization may be based on automatically analyzing portions of the content to determine its context, type, format, or the like. Such analysis may be based on engineering studies, behavioral studies, statistical analysis, or any of a variety of other mechanisms. For example, where lists, images, or the like, may be included, a result of the analysis may be to provide prioritization information for at least some of the portions of the content. One example of an embodiment of prioritization is illustrated in FIG. 6B.

At decision block 504, a determination is made how to perform the page tailoring. In one embodiment, it may be acceptable, based, on an analysis of the content, to discard at least a portion of the content. This may be an acceptable solution, for example, where the content includes data that is prioritized, such that lower priority content may be discarded. In one embodiment, at decision block 504, at least a portion of the content may include an image along with text. In some instances, it may be determined that the text is to be shown, while the image may be discarded. In other instances, it may be determined that the image is more relevant (has a higher priority) than the text. In any event, if discarding at least a portion of the content is an acceptable approach for at least some of the content, processing flows to block 510; otherwise, processing continues to decision block 506.

At block 510, at least a portion of the content may be discarded. In one embodiment, discarding of at least the portion may be based on a prioritization of the content performed above, or elsewhere. For example, in one embodiment, a developer of the content may have included priority information for various portions of the content. Thus, at block 510, at least a portion of the content may be discarded, or otherwise truncated from other content. In one embodiment, discarding of content may also include varying a resolution of an image, audio clip, video clip, or the like, such that the image consumes less memory size. In any event, upon completion of block 510, processing returns to a calling process to perform other actions.

At decision block 506, a determination is made whether to create a link or other association with at least a portion of the content. If it is determined to create a link, or the like, processing flows to block 512; otherwise, processing flows to optional block 508.

At block 512, a portion of the content determined to be rubberbandable may be removed from a first memory page portion of the content and moved to at least a second memory page portion. In one embodiment, the content is appropriated over multiple memory page files. In addition, a link, such as a URL link, a "more" and/or "previous" attribute links, or the like, may be employed to associate the multiple memory pages. One illustration of a use of "more" and "previous" attribute links is shown in FIG. 6A. Upon completion of block 512, processing returns to the calling process to perform other actions.

At block 508, an identifier, tag, or the like, may be provided that enables a downstream conversion process to automatically partition the content across multiple memory page files, and to employ linking between files. Upon completion of block 508, processing returns to the calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

FIGS. 6A-6B illustrate examples of various embodiments of examples of page tailoring content for a mobile device, such as described above in conjunction with FIG. 5.

In FIG. 6A a portion of the content is shown. Content may include any of a variety of data, as described above. Such content may be structured by a developer in any of a variety of ways. For example, as shown, content may be organized into a list, such as list 600A. However, it should be clear that content may include other types of data, organized in other ways, as well.

Assume, for purposes of illustration, that it is determined that the memory page size of the destination mobile device is configured for a maximum of a 4 line list. However, as shown, list 600A includes (5) items 604. Title 602 may be included, and is intended to represent pinned content, such as content that may not be discarded or otherwise deleted. Thus, in this case, list 600A may be shrunk to 4 lines using page tailoring. As described above, shrinking of list 600A may be performed using a variety of mechanisms. For example, in one mechanism, an attribute based on a priority, or the like, may indicate that at a portion of list 600A may be discarded. An example of discarding a portion of the content is shown as list 601A in FIG. 6A, with a reduced set of items 605.

As discussed above, a URL or other link, such as "more" and/or "previous" attribute links may be employed. One example of this is shown in FIG. 6A as lists 602A-603A. As illustrated, items 606 and items 606A represent items 604 partitioned across multiple memory page files, using a "more" link 608, and a "previous" link 608A.

While page tailoring may be performed on portions of the content at a module level, it may also be performed at a page level, such as illustrated in FIG. 6B. Thus, in one embodiment, various modules, such as list modules, text modules, image modules, or the like, may have different properties, prioritizations assigned to them, or the like.

As shown in FIG. 6B, modules m1-m4 are shown, with determined prioritizations p1-p3 within page 600B. In addition, in one embodiment, a developer may include optional URLs url1-4. The URLs, or other links, may be employed during page tailoring. Thus, for example, where it is determined that linking is to be employed, page 601B may illustrate a resulting page, where modules m3-m4 are replaced with their respective links url3-4.

The examples provided should not be construed as narrowing the embodiments of the invention, and are intended merely to provide a better understanding. Thus, other mechanisms may therefore be employed, without departing from the scope of the invention.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. An apparatus that is operative to prepare content for use on a mobile device comprising:
   a memory component for storing data; and
   a processor for executing data that enables actions, including:
      receiving the content destined for the mobile device, wherein the received content is organized into a list having text;
      receiving a memory page size for the mobile device;
      when the list of content exceeds a threshold value for the memory page size for the mobile device, performing page tailoring on the list of content to modify a size of the list of content;
      determining an estimation of effects for at least one of a plurality of conversion processes that are arranged to enable the list of content to be useable on the mobile device, the estimation of effects being obtained without actually performing the at least one of the plurality of conversion processes; and
      when the estimation of effects indicates that an estimated resulting list of content size exceeds the threshold value for the memory page size, then:
         performing page tailoring on the list of content to modify the size of the list of content until the estimation of effects indicate that the estimated resulting list of content size no longer exceeds the threshold value without actually performing the at least one of the plurality of conversion processes to determine the estimation of effects, the page tailoring including at least:
            determining if the list of content is unrubberbandable, and when so, then automatically analyzing the list of content to prioritize and delete at least one portion of the list of content having a lower priority than another portion of the list of content, such that the other portion of the list of content identified as remaining is determined to be rubberbandable; else inhibiting the page tailoring of the list of content.

2. The apparatus of claim 1, wherein estimation of the effects further comprises:
   determining which of the plurality of conversion processes are to be applied to the list of content;
   for each of the determined conversion processes, determining an estimate of a delta page size;

combining the estimates of delta page sizes to determine a total delta page size for the list of content, wherein the total delta page size indicates the estimation of effects.

3. The apparatus of claim 1, wherein the plurality of conversion processes include at least one of adding a footer to the content, adding a header to the content, inserting a session identifier into the content, removing at least one link in the content, deleting an image associated with the content, or adding a location identifier to a portion of the content.

4. The apparatus of claim 1, wherein page tailoring further comprises:
when a portion of the list of content is removable, deleting the portion of the list of content; and
when a portion of the list of content is rubberbandable, creating another list of content based on the rubberbandable portion of the list of content, and inserting a link to the other list of content into the list of content.

5. The apparatus of claim 1, wherein page tailoring further comprises:
creating another list of content based, in part, on the prioritization of at least some of the other portion of the list of content; and
inserting a link to the other list of content into the list of content.

6. The apparatus of claim 1, wherein the processor component enables actions, further comprising:
sending at least the list of content to another apparatus, wherein the other apparatus is configured to apply at least one of the plurality of conversion processes to at least the list of content to enable the list of content to be useable on the mobile device.

7. A non-transitory, processor-readable storage medium having processor-executable instructions for managing content for use on a mobile device over a network, the processor-executable instructions when installed onto a computing device enable the computing device to perform actions, comprising:
receiving the content destined for the mobile device, wherein the content includes text;
receiving a page size for the mobile device;
determining an estimation of effects for at least one of a plurality of conversion processes arranged, in part, to enable the content to be useable on the mobile device the estimation of effects being obtained without actually performing the at least one of the plurality of conversion processes; and
when the estimation of effects indicates that the content including the text exceeds a threshold value for the page size if the at least one of the plurality of conversion processes is applied, performing page tailoring on the content including the text until the estimation of effects no longer exceeds the threshold value, the page tailoring including at least:
determining if the list of content is unrubberbandable, and when so, then automatically analyzing the list of content to prioritize and delete at least one portion of the list of content having a lower priority than another portion of the list of content, such that the other portion of the list of content remaining is determined to be rubberbandable.

8. The non-transitory, processor-readable storage medium of claim 7, wherein the processor-executable instructions enable the computing device to perform actions, further comprising:
prior to performing the estimation of effects, determining when the content including the text exceeds the threshold value for the page size for the mobile device, and when so, performing page tailoring on the content including the text to modify the amount of the content including the text.

9. The non-transitory, processor-readable storage medium of claim 7, wherein performing an estimation of effects further comprises determining a delta size value for at least one of the plurality of conversion processes.

10. The non-transitory, processor-readable storage medium of claim 7, wherein performing an estimation of effects further comprises estimating which of the at least one of the plurality of conversion processes will be applied to the content including the text during conversion.

11. The non-transitory, processor-readable storage medium of claim 7, wherein performing page tailoring further comprises partitioning the content including the text into at least two files, and inserting a link into at least one file, wherein the link couples the two files of partitioned content including the text.

12. The non-transitory, processor-readable storage medium of claim 11, wherein the link further comprises at least one of a URL, a "more" attribute link, or a flag that enables at least one conversion process to insert a URL or a "more" attribute link.

13. The non-transitory, processor-readable storage medium of claim 7, wherein the received content further comprises at least one of a web page, a graphic, an audio file, a document, or a video file.

14. A system useable in managing content for use on a mobile device, comprising:
one or more network devices, having executing thereon:
a web service that is arranged to provide the content, wherein the content is configured independent of the mobile device; and
a connector that is coupled to the web service, and is operative to perform actions, including:
receiving the content having text from the web service;
determining a page size for the mobile device;
determining an estimations of page size effects by at least one of a plurality of conversion processes that are arranged to enable the content having text to be useable on the mobile device, the estimation of effects being obtained without actually performing the at least one of the plurality of conversion processes; and
when the estimation of page size effects indicates that application of the at least one of the plurality of conversion processes is to result in a content size that exceeds a threshold value for the page size for the mobile device, performing page tailoring on the content having text until the estimation of effects no longer exceeds the threshold value without actually performing the at least one of the plurality of conversion processes to determine the estimation of effects, the page tailoring including at least:
determining if the list of content is unrubberbandable and when so, then automatically analyzing the list of content to prioritize and delete at least one portion of the list of content having a lower priority than an other portion of the list of content, such that the other portion of the list of content is determined to be rubberbandable.

15. The system of claim 14, wherein the connector is operative to perform actions, further comprising:
prior to performing the estimation of effects, determining if the content having text exceeds the threshold value for the page size for the mobile device, and if so, performing page tailoring on the content having text.

16. The system of claim 14, wherein the connector and the web services reside within at least one of a same network device, or a different network device.

17. The system of claim 14, wherein performing page tailoring further comprises:
   determining a priority of at least one portion of the content having text;
   when the content having text includes at least one stretchable portion, stretching the portion across multiple files of content having text using at least one link to associate the files.

18. The system of claim 14, wherein the plurality of conversion processes at least one process that is configured to convert at least a portion of the content to an EXtensible Markup Language (XML) format.

19. A method of managing a mobile communication over a network, comprising:
   executing on one or more network devices:
      receiving content associated with a file destined for a mobile device the content including text;
      determining a memory page size for the mobile device;
      when the content exceeds a threshold value for the memory page size for the mobile device, performing page tailoring on the content including text to modify a size of the file;
      determining an estimation of delta page size effects that can result from application of at least one of a plurality of conversion processes that are arranged to enable the content to be useable on the mobile device, the estimation being determined without actually performing the at least one of the plurality of conversion processes, including at least:
      determining if the list of content is unrubberbandable, and when so, then automatically analyzing the list of content to prioritize and delete at least one portion of the list of content having a lower priority than another portion of the list of content, such that the other portion of the list of content remaining is determined to be rubberbandable; and
      when the estimation of delta page size effects indicates that a converted content would exceed the threshold value for the memory page size, performing page tailoring on the content including text to modify the size of the file associated with the content for display at the mobile device.

20. The method of claim 19, further comprising:
   applying at least one of the plurality of conversion processes to the content; and
   sending the converted content towards the mobile device.

21. The method of claim 19, wherein performing page tailoring on the content further comprises stretching the content into multiple files that are coupled to each other using at least one link.

22. The method of claim 19, wherein performing page tailoring on the content further comprises, determining a priority of at least one portion of the content wherein the content further includes an image and the text and determining the priority between at least a portion of the text and the image, and employing the determined priority to at least one of discard at least one portion of the content, or to partition the content into multiple files using at least one linking mechanism.

23. A non-transitory computer-readable storage medium that is configured to store computer-executable instructions that when installed within a network device enables the instructions to perform the method of claim 19.

24. The method of claim 19, wherein performing an estimation of delta page size effects further comprises estimating which of the plurality of conversion processes are likely to be applied to the content.

* * * * *

UNITED STATES PATENT AND TRADEMARK OFFICE
CERTIFICATE OF CORRECTION

| | | |
|---|---|---|
| PATENT NO. | : 7,996,000 B1 | Page 1 of 1 |
| APPLICATION NO. | : 11/537003 | |
| DATED | : August 9, 2011 | |
| INVENTOR(S) | : Micah Dubinko et al. | |

It is certified that error appears in the above-identified patent and that said Letters Patent is hereby corrected as shown below:

Title Page 2, Item (56) in column 1, line 2, under "Other Publications", delete "Wilkimedia" and insert -- Wikimedia --, therefor.

In column 8, lines 5-18, delete "GPS transceiver 264 can also employ other geo-positioning mechanisms, including, but not limited to, triangulation, assisted GPS (AGPS), E-OTD, CI, SAL ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location mobile device may through other components, provide other information that may be employed to determine a physical location of the device, including for example, a MAC address, IP address, or the like." and insert the same on Col. 8, Line 4 after "values." as a continuation of the same paragraph.

In column 16, line 40, in Claim 14, delete "estimations" and insert -- estimation --, therefor.

In column 16, line 57, in Claim 14, delete "unrubberbandable" and insert -- unrubberbandable, --, therefor.

In column 16, line 60, in Claim 14, delete "an other" and insert -- another --, therefor.

Signed and Sealed this
Tenth Day of January, 2012

David J. Kappos
*Director of the United States Patent and Trademark Office*